Figure 1:
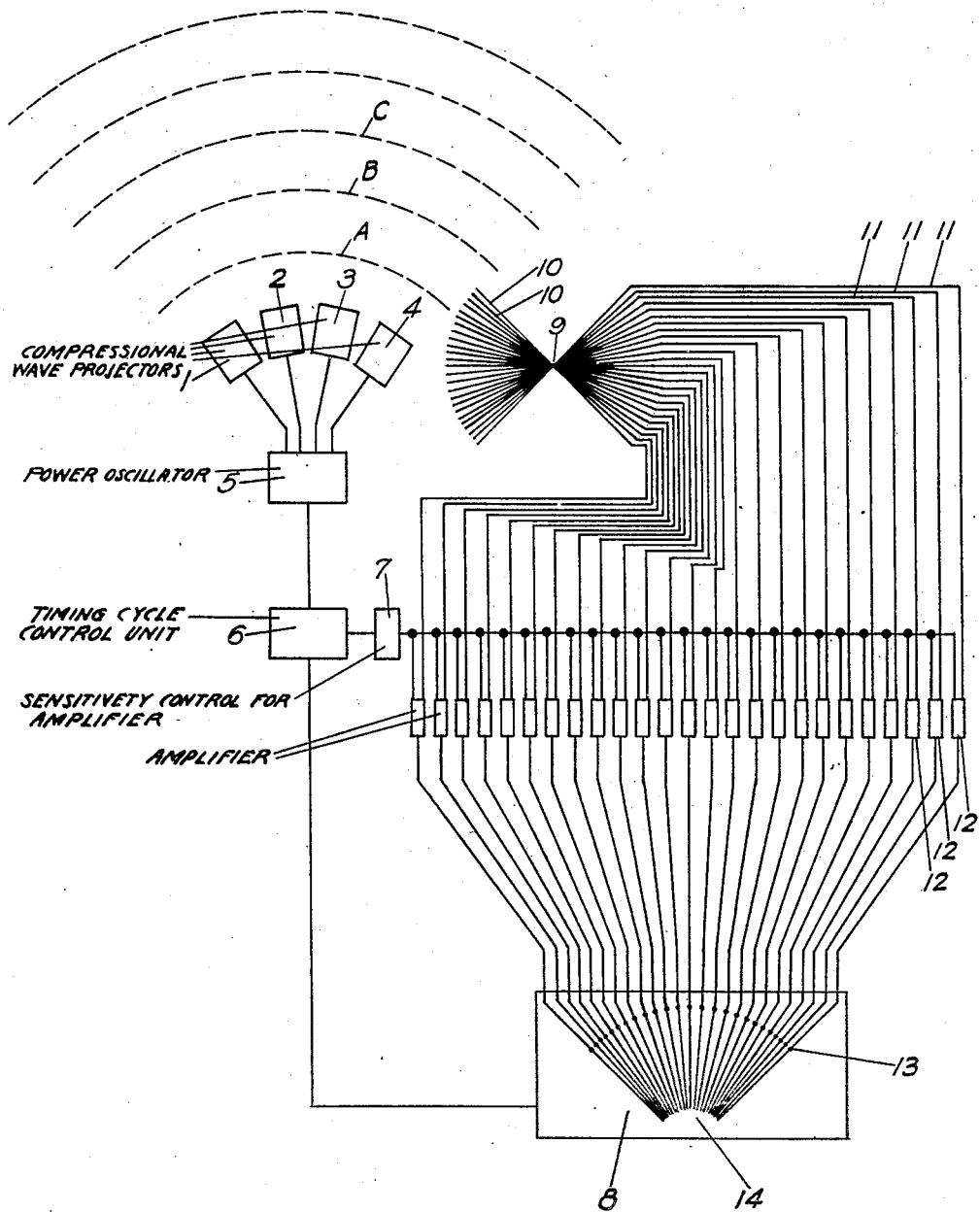

Sept. 24, 1946.   H. BENIOFF   2,408,035
OBSERVATION SYSTEM
Original Filed Oct. 22, 1941   4 Sheets-Sheet 2

INVENTOR
HUGO BENIOFF
BY
ATTORNEY

Sept. 24, 1946.   H. BENIOFF   2,408,035
OBSERVATION SYSTEM
Original Filed Oct. 22, 1941   4 Sheets-Sheet 3

INVENTOR
Hugo Benioff,
BY
ATTORNEY

Sept. 24, 1946.  H. BENIOFF  2,408,035
OBSERVATION SYSTEM
Original Filed Oct. 22, 1941  4 Sheets-Sheet 4

INVENTOR
HUGO BENIOFF
BY
ATTORNEY

Patented Sept. 24, 1946

2,408,035

UNITED STATES PATENT OFFICE 2,408,035

OBSERVATION SYSTEM

Hugo Benioff, Pasadena, Calif., assignor, by mesne assignments, to Submarine Signal Company, Boston, Mass., a corporation of Delaware Original application October 22, 1941, Serial No. 416,111. Divided and this application October 9, 1942, Serial No. 461,642

4 Claims. (Cl. 234—64)

The present application is a division of application Serial No. 416,111, filed October 22, 1941.

The present invention relates to a system for locating obstacles within a given field or area over which observations may be made and is particularly useful for protecting harbors and other water areas.

The system preferably employs compressional wave transmitters and receivers operating in the water and using the reflection from objects and discontinuities in the medium for locating the direction and distance of such obstacles and discontinuities although other waves than compressional waves may be used, as, for instance, shear waves and possibly also electromagnetic waves.

The present invention is particularly adaptable to provide a continuous survey of a given area, for instance, a harbor, channel or the like, and to disclose when the reflecting picture of the area changes and in what manner such changes occur. If no changes occur in the area under survey or observation, then the picture which may be recorded or visually indicated otherwise will remain the same but with vessels approaching and leaving the area, their course and location will immediately become established on the recording element.

In the present invention a compressional wave is radiated in the given sector of observation which may have any desired angular opening depending largely upon the shape of the area to be observed. This radiation may be obtained by use of almost any type of compressional wave projector as, for instance, electrodynamic, electromagnetic, magnetostrictive or piezoelectric projector. A piezoelectric projector of the type described in my copending application Serial No. 386,583, filed April 3, 1941, or of the type described in some of my other copending applications Serial No. 344,363, filed July 8, 1940, and Serial No. 389,209, filed April 18, 1941, and issued as Patent No. 2,346,655, may be used as a projector and preferably the compressional wave distribution over the area is obtained by confining a number of such projecting units together and operating them through a single timing control element. The sound or compressional waves which preferably have a frequency in the supersonic range are picked up after reflection from all sections in the area by fixed directive receivers which are set up in a receptor array each directed to a small receiving angle. A suitable receiver for such purposes is disclosed in my copending application Serial No. 387,633, filed April 9, 1941, and also in my copending application Serial No. 414,132, filed October 8, 1941. Each receiving unit may be made to embrace a small solid angle for reception in a horizontal plane by employing a long receptor unit with a great number of single receptor elements of the type disclosed in some of the above-referred-to applications.

In combination with the elements briefly described a visual or permanent record may be obtained by having an indicating element travel synchronously over a path corresponding to the sound path to which each receiver unit is sensitive in such a time phase as to be in a position to record at any instant a distance corresponding to a reflecting object actuating the receptor unit. The system is particularly useful in detecting the presence and course of both surface vessels and submarines.

An advantage in the present system is that periodic repeated observations are made and that a picture is established in which the permanent reflecting elements are well known and placed so that any other reflecting object not of a permanent character will be easily discernable and recognizable. The slow vibratory movement of the chart provides a means for differentiating from transient disturbances, such as provided by wavelets, and disturbances produced by more permanent objects such as vessels, for instance. The same applies also to sound waves picked up by the receiver units which do not originate from reflections transmitted by the projectors. These being sporadic and non-synchronized with the system, even though they are substantial in intensity, will not produce a definite visual record.

All of these elements in the present system enhance the value of the system as a means of surveying or observing definite chosen areas.

Figure 2:
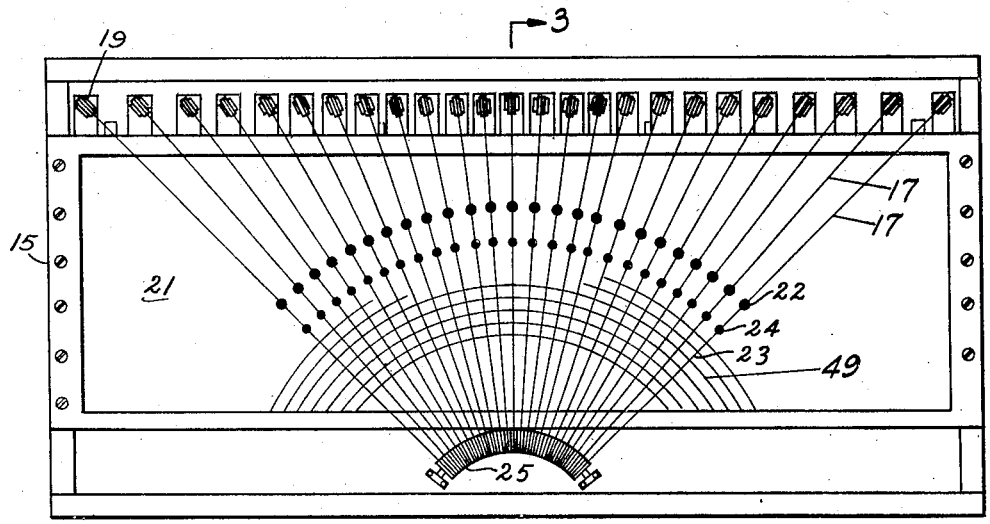
Figures 3, 8:
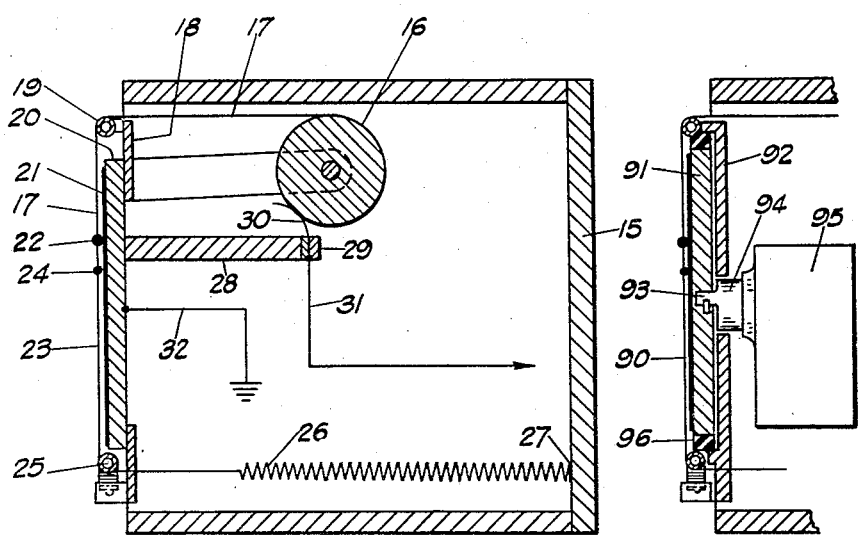
Figure 4:
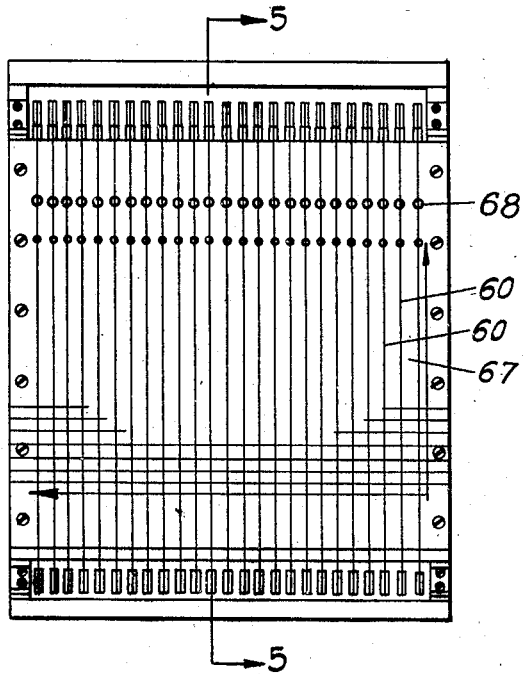
Figure 5:
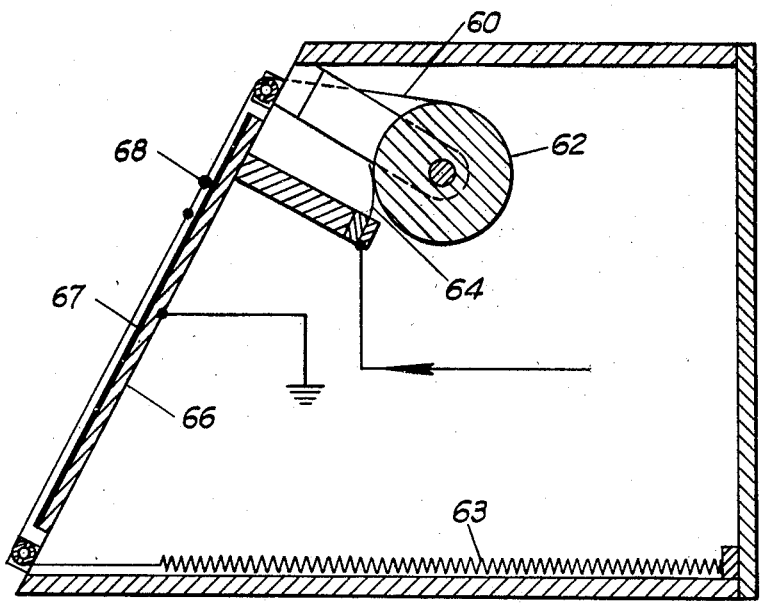
Figure 6:
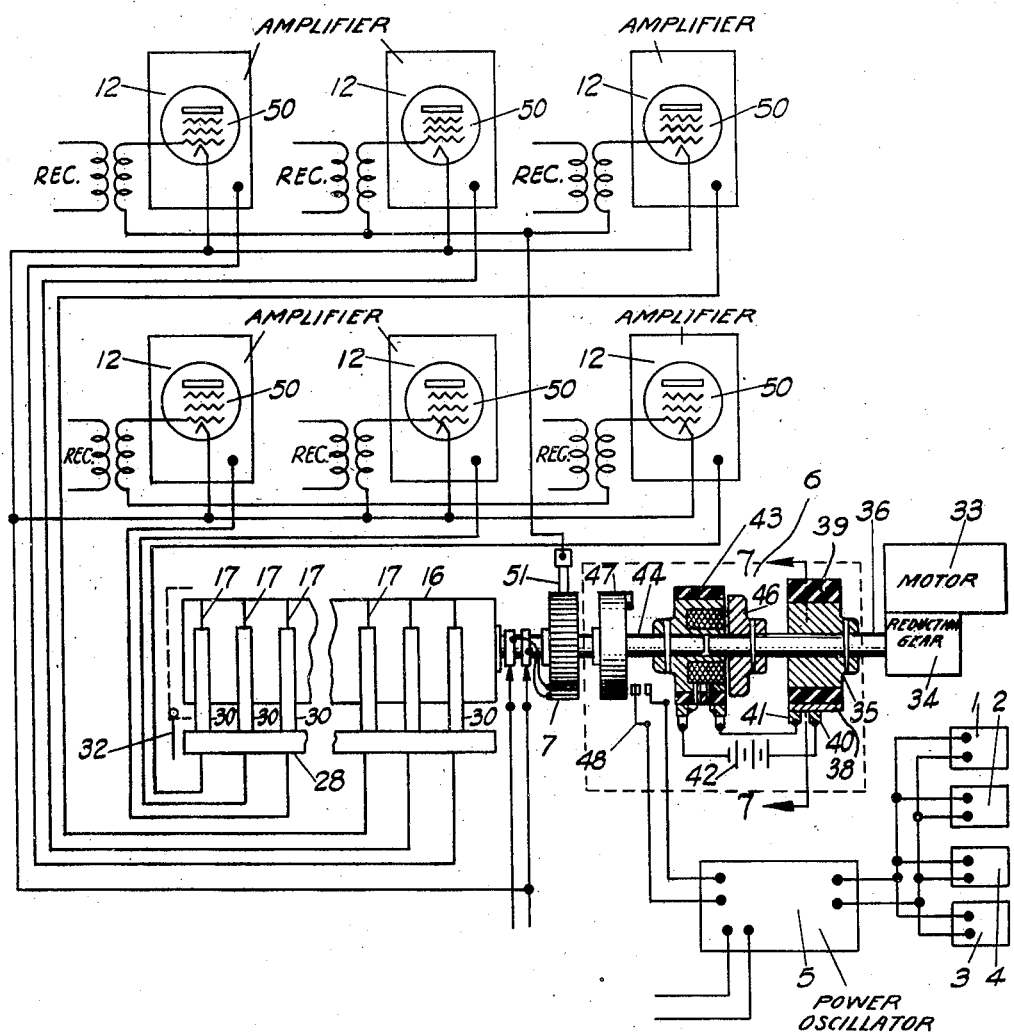
Figure 7:
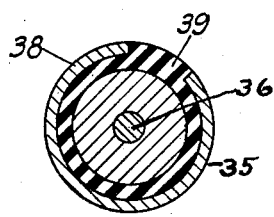

Other merits and advantages of the present invention will be more fully realized and understood upon consideration of the rest of the specification including the drawings illustrating an embodiment of the same in which Fig. 1 shows schematically a diagram of the complete system; Fig. 2 shows a plan view of a recording unit which may be used in connection with the system; Fig. 3 shows a vertical section on the line 3—3 of Fig. 2; Fig. 4 shows a section of a modification of the element shown in Fig. 2; Fig. 5 shows a section on the line 5—5 of Fig. 4; Fig. 6 shows diagrammatically the operation of the system including the relationship of the indicator and other operating parts of the system shown in Figs. 2, 3, 4 and 5; Fig. 7 shows a section on the line 7—7 of Fig. 6; and Fig. 8 shows a further modification of a detail of Fig. 3.

Referring more particularly to Fig. 1, elements 1, 2, 3 and 4 are compressional wave projectors which may be operated simultaneously from the power oscillator or supply 5 to transmit an intense compressional wave pulse of suitable and desirable frequency which may be in the range of sonic or supersonic waves. The projectors 1, 2, 3 and 4 combine in their sound pattern to produce sound waves spreading with uniform intensity as indicated by the dotted arcs A, B, C, etc., within the sector to be observed. The intensity pattern characteristic of each projector is so chosen to provide uniform radiation in a given sector. The power oscillator 5 is operated periodically through a timing cycle control unit 6 which controls the instant of the emission of the compressional wave from the projector units. This timing cycle control element is also synchronized with the control of the sensitivity of the amplifier which is obtained through the unit 7. The unit 7 controls the amplifiers in such a way that they are less sensitive at the times when the sound is arriving from reflecting elements close to the receivers than when it is arriving from elements further away from the receivers. Both the timing cycle control 6 and the cycle sensitivity control 7 for the amplifier are operated in conjunction or in synchronism with the driving mechanism for the recorder 8. The receiver array 9 for receiving the compressional waves reflected from objects in the observed area comprises single receiver units 10, 10, 10, etc., each of which is directively responsive only in a portion of the sector being observed, and preferably the area for each receiver overlaps slightly the receiving area of the adjacent receiver. Each receiver element of the array is connected by separate cables 11, 11, 11, etc., to separate amplifiers 12, 12, 12, etc., which, in turn, are connected to separate recording elements 13, 13, 13, etc., in the recording device 8.

In the system, diagrammatically shown in Fig. 1, the compressional or shear wave pulse is emitted by the projectors 1, 2, 3 and 4 through the control or the timing element 6 when the recording elements 13, 13, 13 are at a zero position with reference to the recording sheet in the recorder 8. In this position when the signal is emitted from the projector, which signal is preferably a very short sound impulse, the recorder elements 13, 13, 13 are drawn together substantially in the position of the arc 14 in the recorder 8. With the travelling of the compressional or shear waves from the projector sources outward, the recording elements 13, 13, 13 of the recorders travel outwards at a rate corresponding to the time of travel of the compressional wave to the reflecting object and back again to the receiver so that this time interval is the measure of the distance of the compressional or shear wave reflecting object. In the system of Fig. 1 the sound picked up by the receiver units 10, 10, 10, etc., is passed over the lines 11, 11, 11 to the amplifiers 12 whose sensitivity is controlled so that they are least sensitive just when the sound is emitted and gradually become more sensitive to a point where the maximum sensitivity is attained at the extreme range that the apparatus is to operate. The cycle of operation may be repeated at intervals depending upon the range of observations which the system is to make. If the longest observation is a range of two miles, for instance, the interval of repetition of the cycle can not approximately be less than about four seconds if the observing medium is water. If more rapid observations are desired, systems employing different frequencies may be operated alternately so that one wave of one frequency may be going out while the other wave of the other frequency is returning. In such a system the operation of the units may also be synchronized and may be made to record their observations on the same recording device.

The mechanism for recording and controlling the operation of the system is more completely shown in Figs. 2, 3, 6 and 7 of the drawings. Referring more particularly to Figs. 2 and 3, 15 represents a casing in which is mounted a drum 16 to which is fastened a plurality of wires 17, 17, 17, etc., of conductive material. The wires 17 come forward from within the casing over a guide plate 18 and a guide pulley 19 in front of a conducting plate 20 having on its surface a recording paper 21 which may be of the type on which a record is produced by passing a current through it. Each wire 17 has a sparking bead 22 carried by the wire. At the end of the wire beyond the sparking bead 22 the wire is joined to an insulating cord or thread 23 at the joint 24. This insulating cord or thread may be of silk, nylon or other such material. The nylon cord or thread passes over a guide pulley 25 at the bottom of the recording panel of the casing and at its end is joined to the helical spring 26, the other end 27 of which is fastened to the casing 15. There may be a spring for each thread 23. Supported from the casing is a support 28 carrying an insulated piece 29 for supporting a set of brushes 30, one for each of the wires 17. A suitable terminal connector 31 is connected to each brush. The conducting plate 20 backing the recording or indicating paper 21 may be returned to the energizing circuit through a common terminal 32. The drum 16 and the guide pulleys 19 as well as the plate 18 are all made of insulating material so that as the current from each amplifier comes in through its line 31, it will pass over its own wire 17 through the sparking bead 22, the plate 20, the terminal connector 32 to ground to which all the amplifiers are connected.

The timing cycle control 6 shown in Figs. 6 and 7 comprises a motor 33 with a reduction gear 34, if necessary, driving a commutator 35 attached to the shaft 36. The commutator 35 is indicated in section in Fig. 7 which shows it as having a large conducting section 38 and a small insulating section 39. The brushes 40 and 41 which may be set in fixed positions bear against the commutator 35. These brushes 40 and 41 are connected in circuit with a battery 42 and a magnetic clutch 43 which is supported on a shaft 44 driving the drum 16 and the cycle sensitivity control 7 both of which may be locked to the shaft 44. Aligned and in opposed position to the shaft 44 is the shaft 36 carrying the clutch armature 46. When the brushes 40 and 41 bear on the conducting segment 38, the clutch 43 locks together the two shafts 36 and 44 and drives the drum 16 and the cycle sensitivity control 7 as well as the cam 47 for controlling the signal transmission. The shaft 36 continues to drive these elements around until the brushes 40 and 41 bear upon the insulating portion 39 of the commutator and thereupon release the shaft 44 permitting the springs 26, Fig. 3, to draw back or return the wires 17 with their sparking beads 22 to a normal beginning position. Since the wires 17 are attached to the drum 16, the drum and the cycle sensitivity control on the shaft 44 will also be returned to its initial position, as well as the cam 47 which controls a switch 48 to initiate the operation of the system by keying the projectors 1, 2, 3 and 4. The cam and switch are so arranged as shown in the drawings that the switch will be operated only in the forward or driving direction of the shaft 44, that is, when the two shafts 36 and 44 are coupled together. In the operation of the system, therefore, the motor driving the shaft 36 through the reduction gear 34 will complete the circuit to energize the clutch 43 when the brushes 40 and 41 engage the conducting element 38 of the commutator 35. The shaft 44 will thereupon begin to rotate with the same speed as the shaft 36 and at the proper instant in the beginning of the cycle of rotation of the drum 16, the cam 47, the projectors 1, 2, 3 and 4 will be keyed. The continued rotation of the drum 16 will draw the sparking beads across the recording paper and at the same time decrease the bias on the grids 50 of each amplifier 12 to make the amplifiers gradually more sensitive. This may be accomplished by making the cycle sensitivity control 45 a potentiometer rotating with the shaft 44 and connecting the grids 50 through the brush 51 so that as the shaft 44 rotates in the proper direction, the bias will decrease. The drum 16 and shaft 44 are rotated at the proper speeds to record correct distances when an indication is made corresponding to the graduations 49 on the marking paper or chart.

In the modifications shown in Figs. 4 and 5, instead of radiating the recording wires from a central point, the recording wires 60, 60 are all arranged to move parallelly over a recording paper 67. The operating mechanism, however, in Figs. 4 and 5, is in general the same as Figs. 2 and 3 with the drum 62 corresponding to the drum 16, the helical spring 63 corresponding to the spring 26 and the brushes 64 corresponding to the brushes 30. As indicated more clearly in Fig. 5, the front of the casing may have its conducting plate 66 arranged in an incline with the recording paper 67 lying on the surface of the plate 66 and the sparking bead 68 moving in contact over the paper surface in the same manner as the sparking bead 22. The use of parallel recording wires will, of course, to some extent distort the recording chart, but this may be overcome by proper calibration of the chart and by proper mapping of the observed area on the chart if that is desired. For the purpose the chart may be graduated as a "mercators" chart choosing, of course, the proper axis. The recording papers 21 and 67 may be mounted in any suitable manner upon the face of the recorders.

While the charts may be changed as often as desired, it may be desirable to use the chart for a comparatively long period as, for instance, ten or fifteen minutes or even more. This is particularly true where it is desired to trace the course of a ship or make observations of vessels or objects where an accumulation of recorded details aids in location of objects and the determination of distance and direction.

In the detail illustrated in Fig. 8 the chart 90 may be mounted on a plate 91 within a supporting frame 92. The plate 91 may be supported by a spindle 93 which is eccentrically placed on a shaft 94 which, in turn, is rotated very slowly by a suitable motor through the reduction gear 95. This motor may be the same motor as shown in Fig. 6 or it may be synchronized with it or even run independently. The space between the flange of the frame 92 and the rim of the plate 91 may be occupied by yielding material 96, if desired, but this in fact may be omitted. The rotation of the shaft 94 will slowly oscillate the sheet in a circle of a very small radius about the shaft 94. This radius should be great enough so that successive recordings of the same object in the same spot will create a mark the size of the circle of oscillation of the chart and thereby permit an accumulation of successive receptions to produce a mark and noticeable indication. The recording marks will come at random places in the circle made by the recording bead and will therefore in successive measurements make a noticeable mark. The spot thus made will be clearly visible in spite of the wire 17 and the beads, which, however, may be very fine if desired. This accumulation of individual recording points for a single object will aid in distinguishing reflection objects persisting in the field from those which are of a more transient nature.

Having now described my invention, I claim:

1. In a system for surveying an area with the use of compressional waves, an exhibiting device for use therewith comprising a casing having an exhibiting surface, a plurality of flexible wires having each a recording bead carried thereon, means for drawing said beads by means of said wires over said exhibiting surface, and means completing an electrical circuit through said wires and said beads across said exhibiting surface.

2. In a system for surveying an area with the use of compressional waves, an exhibiting device for use therewith comprising a casing having an exhibiting surface, a plurality of flexible wires having each a recording bead carried thereon, means for drawing said beads by means of said wires over said exhibiting surface, and means completing an electrical circuit through said wires and said beads across said exhibiting surface, said means including an insulating drum over which said wires are drawn, a conducting brush, one for each of said wires and means mounting said conducting brushes in position to bear continuously on said wires.

3. In a system for surveying an area with the use of compressional waves, an exhibiting device for use therewith comprising a casing having an exhibiting surface, a plurality of flexible wires each having a recording bead carried thereon, means mounting said wires to be moved across said exhibiting surface, an insulating drum to which the wires are attached at one end, spring means adapted for substantial elongation having one end attached to said wires and the other end anchored to said casing, a plurality of brushes, one each adapted to bear against one of said wires respectively for conducting current thereto, means completing an electrical circuit through all said wires and said exhibiting surface, and means for driving said drum.

4. In a system for surveying an area with the use of compressional waves, an exhibiting device for use therewith comprising a casing having an exhibiting surface, a plurality of flexible wires each having carried thereon a recording bead of an electric conductive material in close relationship to said surface, means mounting said wires to be moved across said exhibiting surface, an insulating drum to which the wires are attached at one end, spring means adapted for substantial elongation having one end attached to said wires and the other end anchored to said casing, a plurality of brushes, one each adapted to bear against one of said wires respectively for conducting current thereto, means responsive to the return of a compressional wave completing an electrical circuit through all said wires and said exhibiting surface, means for driving said drum comprising a motor adapted to turn continuously, clutch means operatively associated with the drum and motor for coupling said drum to said motor and control means operatively associated with said motor and said clutch for controlling the operation of said clutch means to release and restore the same whereby the drum is periodically released to permit the springs to withdraw the beads to the original position and to repeat the operation.

HUGO BENIOFF.